United States Patent [19]
Biro

[11] 3,712,150
[45] Jan. 23, 1973

[54] COMPOUND MOTION TRANSMITTING LINKAGE

[75] Inventor: Steven L. Biro, Inkster, Mich.

[73] Assignee: Ford Motor Company, Dearborn, Mich.

[22] Filed: Aug. 30, 1971

[21] Appl. No.: 176,082

[52] U.S. Cl. .................................74/473 R, 74/484
[51] Int. Cl. .............................................G05g 9/00
[58] Field of Search .....74/473 R, 473 SW, 475, 476, 74/477, 484, 519; 287/93, 96

[56] References Cited

UNITED STATES PATENTS

| | | | |
|---|---|---|---|
| 3,172,301 | 3/1965 | Hurst et al. | 74/473 R |
| 3,600,966 | 8/1971 | Anderson | 74/484 X |

Primary Examiner—Milton Kaufman
Assistant Examiner—Frank H. McKenzie, Jr.
Attorney—Keith L. Zerschling et al.

[57] ABSTRACT

A compound motion transmitting lever mechanism adapted especially for use in controlling ratio shifts in a power transmission mechanism for an automotive vehicle comprising a rotary actuator lever, a remotely situated control lever, and an intermediate lever having a universal bearing support at a location intermediate its ends, one end of the intermediate lever being mechanically connected to one end of the actuator lever and the other end of the intermediate lever being connected to the control lever, wherein the universal bearing means accommodates both rotary motion of the intermediate lever about its axis of oscillation and angular adjustment thereof in a plane that is transverse to its axis of oscillation.

8 Claims, 10 Drawing Figures

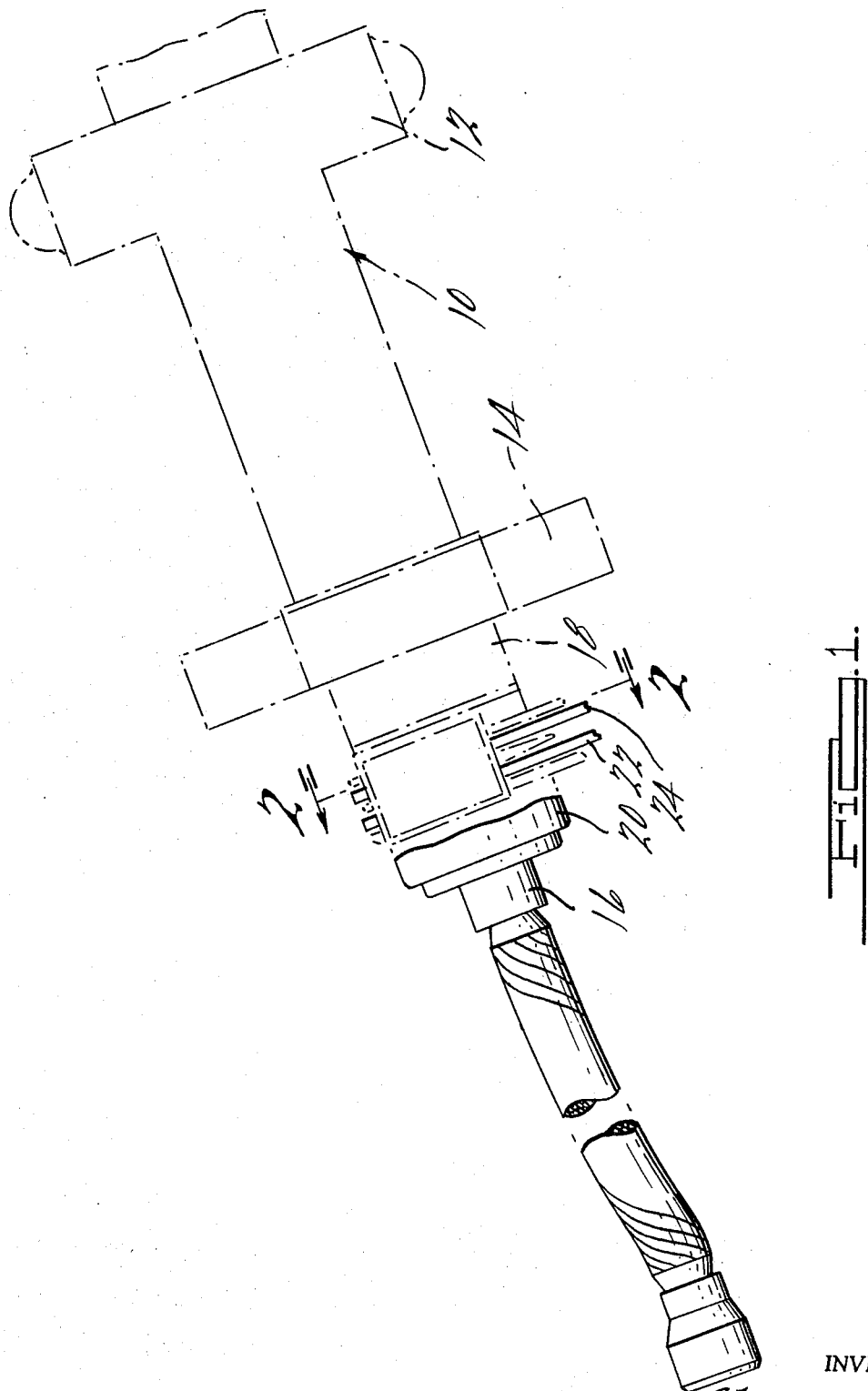

PATENTED JAN 23 1973
3,712,150
SHEET 2 OF 4
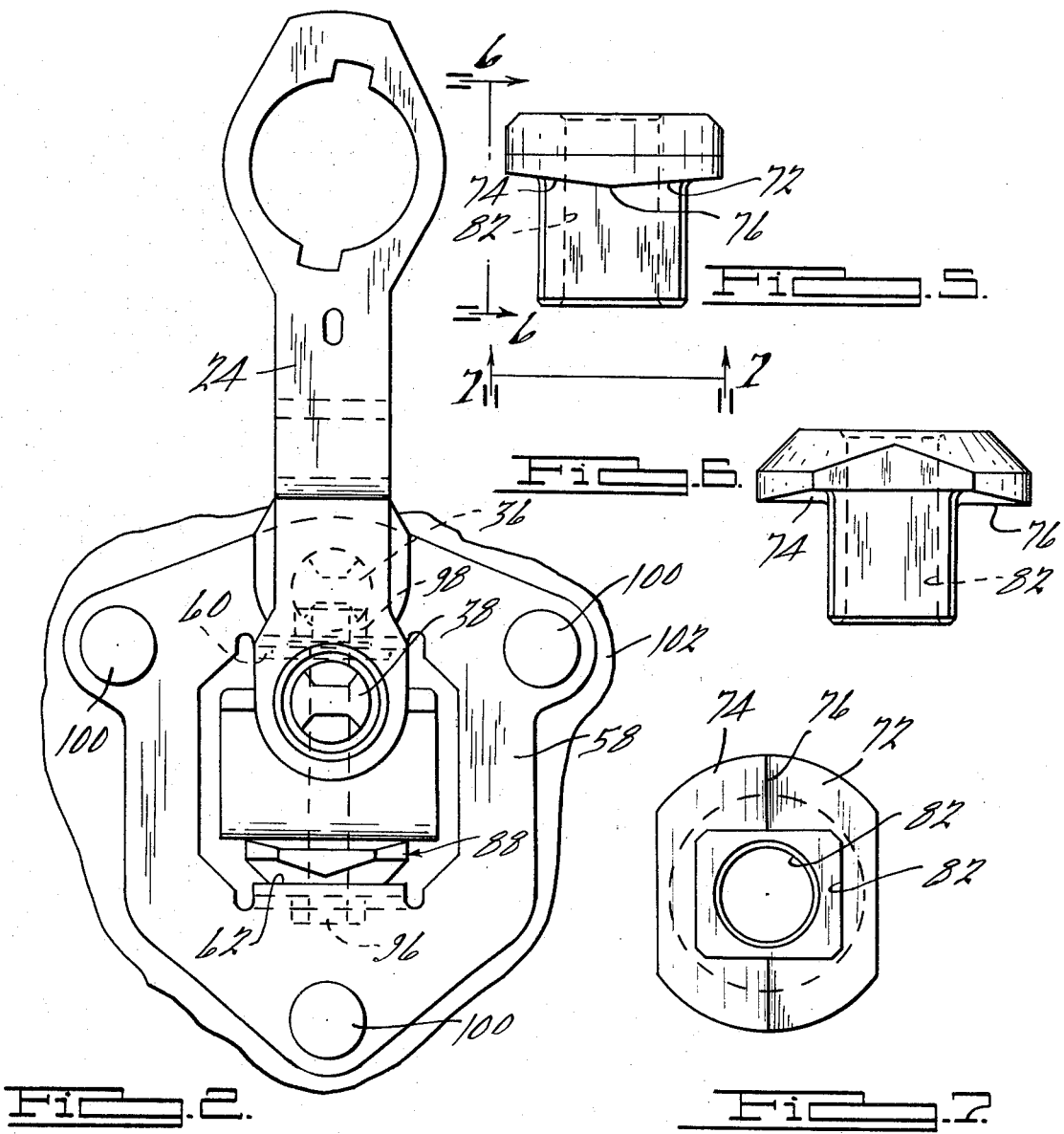
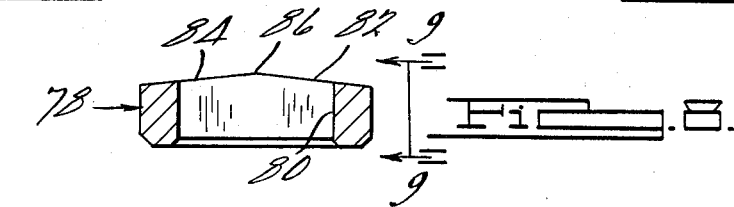
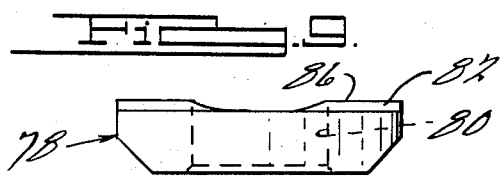
INVENTOR:
Steven E. Bito
BY: Keith L. Zerschling
and Donald J. Herrington
ATTORNEYS

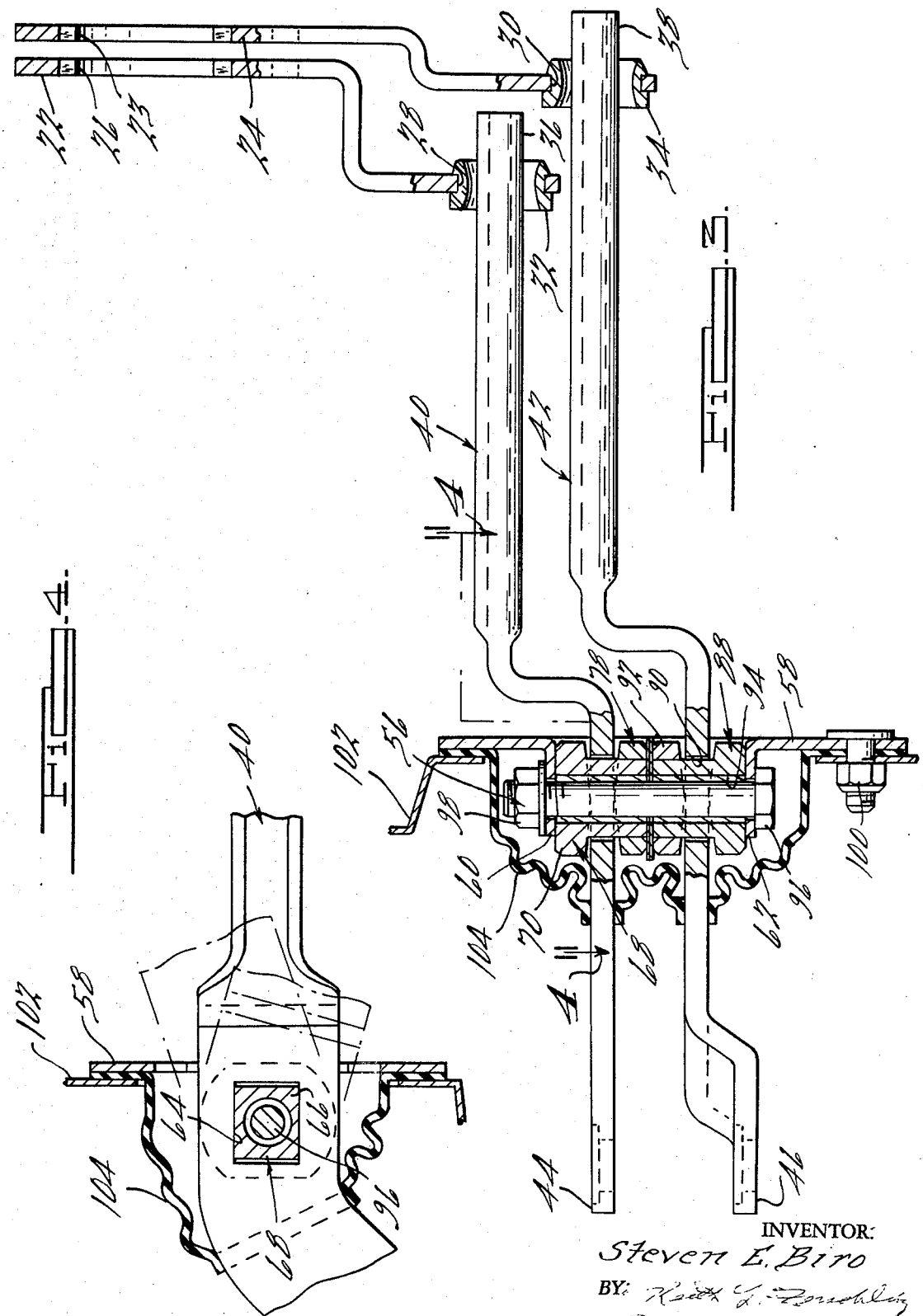

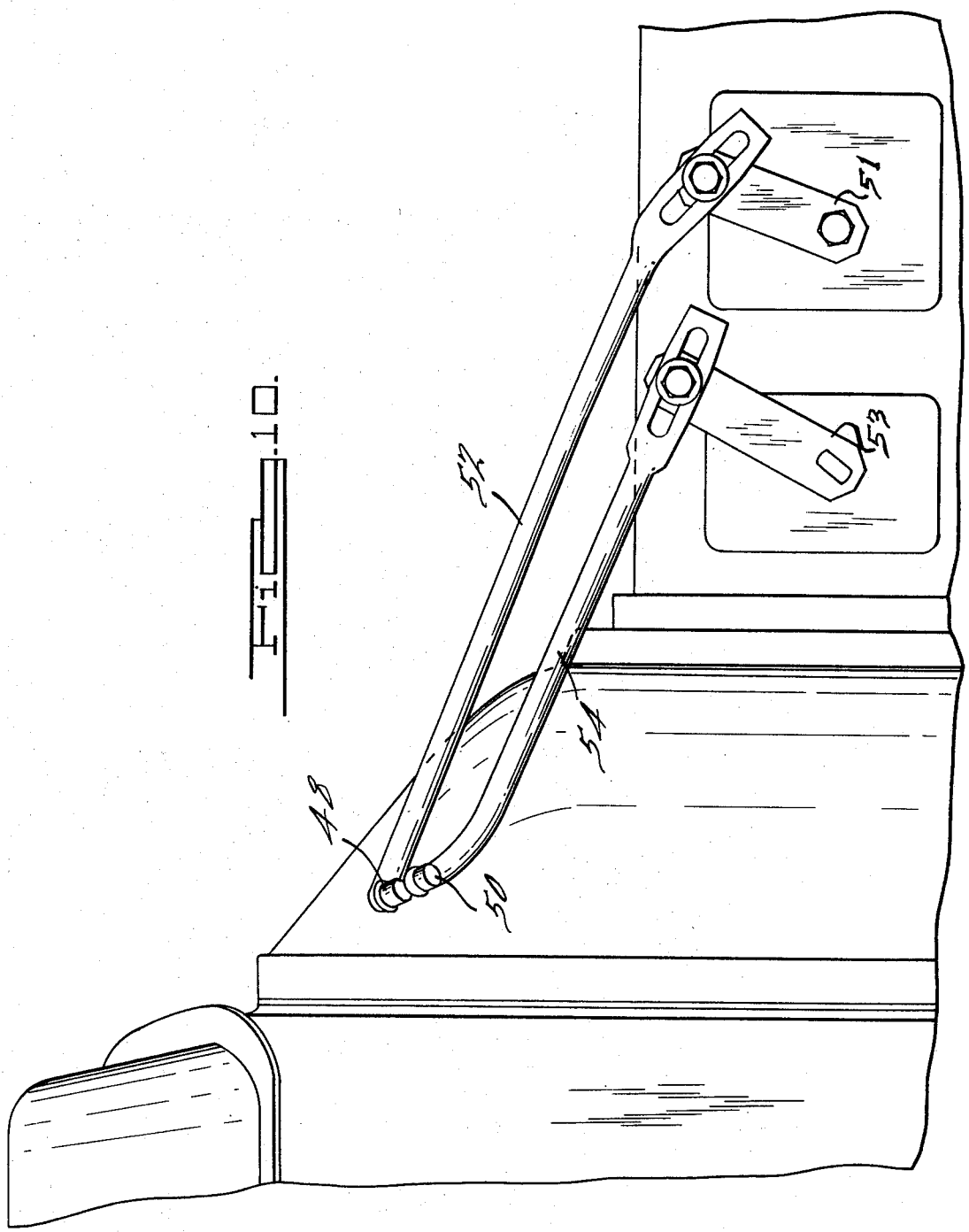

COMPOUND MOTION TRANSMITTING LINKAGE

GENERAL DESCRIPTION OF THE INVENTION

The improvements of my invention are adapted especially to be used in a gearshift lever arrangement for an automotive vehicle especially when the vehicle includes a so-called mini steering column of the type shown in U.S. Pat. No. 3,575,061. A column of that type, which supports the steering wheel, is displaced in parallel disposition with respect to the axis of the vehicle steering gear mechanism. In such arrangements the steering column is mounted upon the forward vehicle structure in the vehicle passenger compartment and at least one driver operated transmission ratio shift linkage element is mounted rotatably upon it. A driver operated shift selector lever also is mounted for oscillation about the axis of the steering column and is connected to the shift linkage element by means of a positive acting clutch. These linkage elements are connected to an intermediate control lever which is mounted by means of a universal bearing on a fixed portion of the vehicle body. The axis of oscillation of the intermediate lever is generally transverse and offset with respect to the axis of oscillation of the shift selector lever.

The other end of the intermediate lever is connected by means of a mechanical linkage to a control lever which is mounted usually on the exterior of the transmission housing.

Upon rotation of the shift lever by the vehicle operator, the end of the shift linkage element and the first end of the intermediate lever will rise and fall due to the arcuate motion at the connection between them. Simultaneously the intermediate lever is rotated about its own axis. This rotation is transmitted through the mechanical linkage to the control lever of the transmission thereby initiating ratio changes.

The universal bearing substantially eliminates stray motion of the linkage elements although it is capable of accommodating the compound motion made necessary by the arcuate motion of the ends of the shift linkage member.

The universal bearing is capable of permitting rocking motion about a pivot located at the axis of oscillation of the shift lever. Provision is made also for permitting rotary oscillations of the pivot member for the lever thereby providing a universal movement with little or no lost motion.

BRIEF DESCRIPTION OF THE FIGURES OF THE DRAWING

FIG. 1 shows in elevation a portion of the base of a steering column for use in an automotive vehicle.

FIG. 2 shows an end view of a shift lever as seen from the plane of section line 2—2 of FIG. 1.

FIG. 3 is an assembly view showing the shift linkage mechanism of my invention together with the universal connection between the operating levers and a relatively stationary pivot structure.

FIG. 4 is a cross-sectional view taken along the plane of section line 4—4 of FIG. 3.

FIG. 5 is a side elevation view of a pivot member used in the universal connection shown in FIG. 3.

FIG. 6 is a side view of the pivot member of FIG. 5 as seen from the plane of section line 6—6 of FIG. 5.

FIG. 7 is an end view of the member of FIG. 5 as seen from the plane of section line 7—7 of FIG. 5.

FIG. 8 is another pivot member adapted to cooperate with the member of FIG. 5 in the universal connection shown in FIG. 3.

FIG. 9 is a side elevation view of the member of FIG. 8 as seen from the plane of section line 9—9 of FIG. 8.

FIG. 10 is a side elevation view showing motion transmitting linkage members for transmitting motion from the lever shown in FIG. 3 to the transmission ratio controlling levers.

PARTICULAR DESCRIPTION OF THE INVENTION

FIG. 1 shows a base portion of a so-called mini steering column 10. It is adapted to be mounted on the vehicle dash structure intermediate the vehicle passenger compartment and the vehicle engine compartment. Reference may be made to U.S. Pat. No. 3,575,061 for a description of a mini column of this type. A particular description of this structure will not be repeated here.

Mini column 10 includes supporting brackets 12 and 14. It is adapted to support a vehicle steering wheel within the vehicle passenger compartment. The steering wheel is connected to a steering shaft 16 journalled rotatably within the column assembly. An exterior column sleeve 18 supports a shift linkage mounting member 20. A gearshift sleeve shaft is mounted within the column sleeve 18 in concentric disposition with respect to the steering shaft 16. A selectively-engagable, double-dog clutch structure is used to establish an operative connection between the gearshift sleeve shaft and each of two shift levers 22 and 24.

The levers 22 and 24 are adapted to rotate about the axis of the steering shaft 16. They may be connected selectively to the gearshift sleeve shaft and rotated by the sleeve shaft as the operator moves the gearshift selector lever within the vehicle passenger compartment about the axis of the steering column.

Lever 22 is activated when the gearshift sleeve shaft is moved outwardly and rotated in one direction or the other. Lever 24 is actuated when the sleeve shaft is moved upwardly and rotated. Lever 22 controls ratio changes between the second speed ratio and a third speed ratio in the three-speed transmission. Lever 24 controls ratio changes between the first or lowest speed ratio and reverse ratio. Levers 22 and 24 are formed with openings 26 and 23, respectively, which receive the driver controlled shift sleeve shaft. The radially outward ends of the levers 22 and 24 are apertured at 28 and 30, respectively. Located in the openings 28 and 30 are inserts 32 and 34, respectively, which are formed preferably of a bearing plastic material. The inserts 32 and 34 surround the ends 36 and 38, respectively, of levers 40 and 42. The lever ends 36 and 38 are flattened as best indicated in FIG. 2, and the inserts conform generally to the shape of these ends. The inserts permit sliding motion of the lever ends within the openings 28 and 30.

The opposite ends 44 and 46 are apertured to receive the ends 48 and 50 for the motion transmitting rods 52 and 54 shown in FIG. 10. The opposite ends of these rods are connected to the transmission shift levers 51 and 53 in a manner similar to the connection described in U.S. Pat. No. 3,575,061.

An intermediate portion of each of the levers 40 and 42 is journalled on a universal pivot assembly, one of which is shown in FIG. 3 at 56. This comprises a supporting bracket 58 having spaced parallel walls 60 and 62. Lever 40 is provided with a square opening 64 within which is received a square shank 66 of a first pivot member 68. A head 70 for the pivot member 68 is provided with a pair of flat surfaces 72 and 74 situated on an angle with respect to the plane of the adjacent intermediate portion of the lever 40. The planes 72 and 74 intersect at an apex line 76 which engages one side of the lever 40.

A second pivot member 78 is located on the opposite side of the lever 40. It is provided with an opening 80 which is aligned with a central opening 82 formed in the member 68. Pivot member 80 is formed with surfaces 82 and 84 which are angularly displaced with respect to the plane of the intermediate portion of lever 40. The apex line 86 of the member 78 engages the side of the lever 40.

A third pivot member 88, which is similar to pivot member 68, is received in square opening 90 formed in lever 42. A fourth pivot member 92 surrounds the shank for the member 88. It is located on the opposite side of the lever 42 and is formed with angularly disposed surfaces similar to the surfaces formed on member 78.

Member 78 surrounds the shank 66 of the member 68. The ends of the shanks for the members 68 and 88 engage each other as indicated in FIG. 3. A spacer sleeve 94 is received through the central opening formed in the members 68 and 88 and clamping bolt 96 extends through the sleeve 94. The bolt extends also through aligned openings formed in the end walls 62 and 60 and it is secured in place by nut 98. Mounting bracket 58 is secured by bolts 100 to a supporting wall 102 which may form a part of the vehicle body structure. A flexible boot 104 is held in place between the mounting bracket 58 and the wall 102 on its margin. It is adapted to surround the universal connection 56 and is provided with openings through which the levers 40 and 42 extend.

As the levers 22 and 24 are oscillated about their pivotal axes, which correspond to the axis of the steering column, their ends will cause oscillation of the levers 40 and 42 about the pivotal axis of the connection 56. Oscillation of the levers 40 and 42 occurs about axes that are transversely disposed. Therefore the ends 36 and 38 of the levers 40 and 42 will rise and fall with respect to their planes of oscillation. This secondary motion is accommodated by the universal connection 56 because of the pivotal action made available by the pivot members 68, 78, 92 and 88. The angular disposition of the pivot surfaces of these members provides the necessary clearance to permit oscillation of the levers about their respective pivot lines.

As the levers 40 and 42 oscillate about the axis of the connection 56, the pivot members 68, 78, 92 and 88 rotate about the spacer 94. Thus the pivot lines established by the pivot members for the levers rotate so that they are at all times disposed perpendicularly with respect to the direction of the secondary motion of the ends 36 and 38 due to the rising and falling as the levers 22 and 24 are moved arcuately. Thus no binding action occurs and looseness and stray motion is eliminated. These characteristics are accomplished without the necessity for providing the usual ball and socket type retainer members found in universal couplings of prior art designs, one of which is illustrated in U.S. Pat. No. 3,575,061.

Having thus described a preferred form of my invention,

What I claim and desire to secure by U.S. Letters Patent is:

1. A motion transmitting linkage mechanism adapted to transmit rotary motion of a driving member mounted for a movement about a first axis to a driven member adapted for rotary movement about a second axis displaced transversely with respect to the first axis, one end of said driving member being connected to one end of said driven member, the other end of said driven member being connected to motion transmitting linkage elements, a universal pivotal connection between an intermediate portion of said driven member and a stationary member comprising a pivot member secured nonrotatably to said driven member, means for rotatably mounting said pivot member on said stationary member, said pivot member including pivot surfaces adjacent said intermediate portion and defining an apex that engages said intermediate portion along a pivot line whereby said driven member is adapted for limited oscillation about said pivot line as it is oscillated by said driving member about said second axis.

2. The combination mechanism as set forth in claim 1 wherein said pivot line is fixed with respect to any point on the said driven member whereby said driven member is adapted to oscillate without binding about said pivot line upon rotary adjustment of said driving member.

3. A motion transmitting linkage mechanism adapted to transmit rotary motion of a driving member mounted for movement about a first axis to a driven member adapted for rotary movement about a second axis displaced transversely with respect to the first axis, one end of said driving member being connected to one end of said driven member, the other end of said driven member being connected to motion transmitting linkage elements, a universal pivotal connection between an intermediate portion of said driven member and a stationary member comprising first and second pivot members secured nonrotatably to said driven member, means for rotatably mounting said pivot members on said stationary member, said first and second pivot members being located on opposite sides of said driven member when said driven member is adapted for pivotal oscillation as it is rotated about said second axis, each pivot member having pivot surfaces angularly disposed with respect to the plane of oscillation of said driven member and defining a pivot line, the pivot line for each pivot member intersecting said second axis.

4. The mechanism as set forth in claim 3 wherein said first pivot member comprises a head and shank, said shank being noncircular, an aperture in the intermediate portion of said driven member having a shape generally similar to the shape of said shank whereby said pivot member is nonrotatably joined to said driven member, said second pivot member being received over said shank and located on the side of said driven member opposite to the side of said driven member on which said head is located.

5. The mechanism as set forth in claim 3 wherein said pivot members have a central opening, a bearing spacer in said bearing opening, means for securing said spacer to said stationary member whereby said pivot members rotate about said spacer upon rotation of said driven member.

6. The mechanism as set forth in claim 4 wherein said pivot members have a central opening, a bearing spacer in said bearing opening, means for securing said spacer to said stationary member whereby said pivot members rotate about said spacer upon rotation of said driven member.

7. A gearshift linkage mechanism in combination with an automotive vehicle steering column and transmission ratio controlling elements, a driver operated shift selector shaft supported by said steering column, a motion transmitting mechanism connecting said driver operated selector shaft and said transmission ratio controlling elements including a driving linkage member adapted to be connected to said selector shaft and a driven linkage member connected to said ratio controlling elements, a universal pivotal connection between an intermediate portion of said driven member and a stationary member comprising a pivot member secured nonrotatably to said driven member, means for rotatably mounting said pivot member on said stationary member, said pivot member including pivot surfaces adjacent said intermediate portion and defining an apex that engages said intermediate portion along a pivot line whereby said driven member is adapted for limited oscillation about said pivot line as it is oscillated by said driving member about the rotary axis of said driven member.

8. The combination as set forth in claim 7 wherein said pivot line is fixed with respect to any point on the said driven member whereby said driven member is adapted to oscillate without binding about said pivot line upon rotary adjustment of said driving member.

\* \* \* \* \*